United States Patent [19]
Ritter et al.

[11] Patent Number: 5,316,699
[45] Date of Patent: May 31, 1994

[54] PROCESS FOR THE CONTROLLED PREPARATION OF A COMPOSITE OF ULTRAFINE MAGNETIC PARTICLES HOMOGENEOUSLY DISPERSED IN A DIELECTRIC MATRIX

[75] Inventors: Joseph J. Ritter, Mt. Airy; Robert D. Shull, Boyds, both of Md.

[73] Assignee: The United States of America as repesented by the Secretary of Commerce, Washington, D.C.

[21] Appl. No.: 501,981

[22] Filed: Mar. 28, 1990

[51] Int. Cl.$^5$ .................... G02B 5/20; B01J 13/00; C08L 83/00
[52] U.S. Cl. .................... 252/584; 252/582; 252/587; 252/588; 252/315.6; 524/429; 524/431; 524/588
[58] Field of Search ............... 252/582, 584, 587, 588, 252/315.01, 315.6; 524/429, 431, 588

[56] References Cited

U.S. PATENT DOCUMENTS

| | | | |
|---|---|---|---|
| 2,496,265 | 2/1950 | Bilisoly | 428/553 |
| 3,188,217 | 6/1965 | Elmer et al. | 252/584 |
| 3,261,802 | 7/1966 | Bobear | 524/431 |
| 3,284,369 | 11/1966 | Bergna et al. | 252/454 |
| 3,474,039 | 10/1969 | Newing | 252/584 |
| 3,551,352 | 12/1970 | Carr et al. | 252/439 |
| 3,791,808 | 2/1974 | Thomas | 252/584 |
| 4,113,658 | 9/1978 | Geus | 252/454 |
| 4,529,749 | 7/1985 | Favre et al. | 524/588 |
| 4,678,717 | 7/1987 | Nickola et al. | 428/553 |
| 4,764,499 | 8/1988 | Vanderspurt et al. | 502/258 |
| 4,959,247 | 9/1990 | Moser et al. | 427/126.5 |

OTHER PUBLICATIONS

B. Abeles, Appl. Solid State Sci. 6, 1 (1976).
R. A. Roy and R. Roy, Mat. Res. Bull. 19, 169 (1984).
E. J. A. Pope and J. D. Mackenzie, J. Non-Crys. Sol. 87, 185 (1986).
Shull et al., *Multicomponent Ultrafine Microstructures* (edited by L. E. McCandlish et al., MRS Symposium Proc., vol. 132 (1989) p. 179.
J. B. Chan et al., J. Mater. Res., 4, (1989), 693.
Schmitt et al., Chemical Engineering at Supercritical Fluid Conditions, Paulaites et al., eds., Ann Arbor Science Publishers, Ann Arbor, MI (1983) p. 445.
Kein et al., Ultrastructure Processing of Ceramics Glasses and Composites, Hench et al., eds., John Wiley and Sons, N.Y., p. 88, (1984).
Larry L. Hench, Science of Ceramic Chemical Processing, Hench et al., eds., John Wiley and Sons, N.Y., p. 52, (1986).

*Primary Examiner*—Philip Tucker
*Attorney, Agent, or Firm*—Oliff & Berridge

[57] ABSTRACT

A chemical process for producing bulk quantities of an iron-silica gel composite in which particle size, form, and magnetic state of the iron can be selected. The process involves polymerizing an ethanolic solution of tetraethylorthosilicate, ferric nitrate and water at low temperature under the influence of an HF catalyst. The chemical and magnetic states of the iron in the resultant composite are modified in situ by exposure to suitable oxidizing or reducing agents at temperatures under 400° C. Iron-containing particles of less than 200 Å diameter, homogeneously dispersed in silica matrices may be prepared in paramagnetic, superparamagnetic, ferrimagnetic and ferromagnetic states.

17 Claims, 12 Drawing Sheets

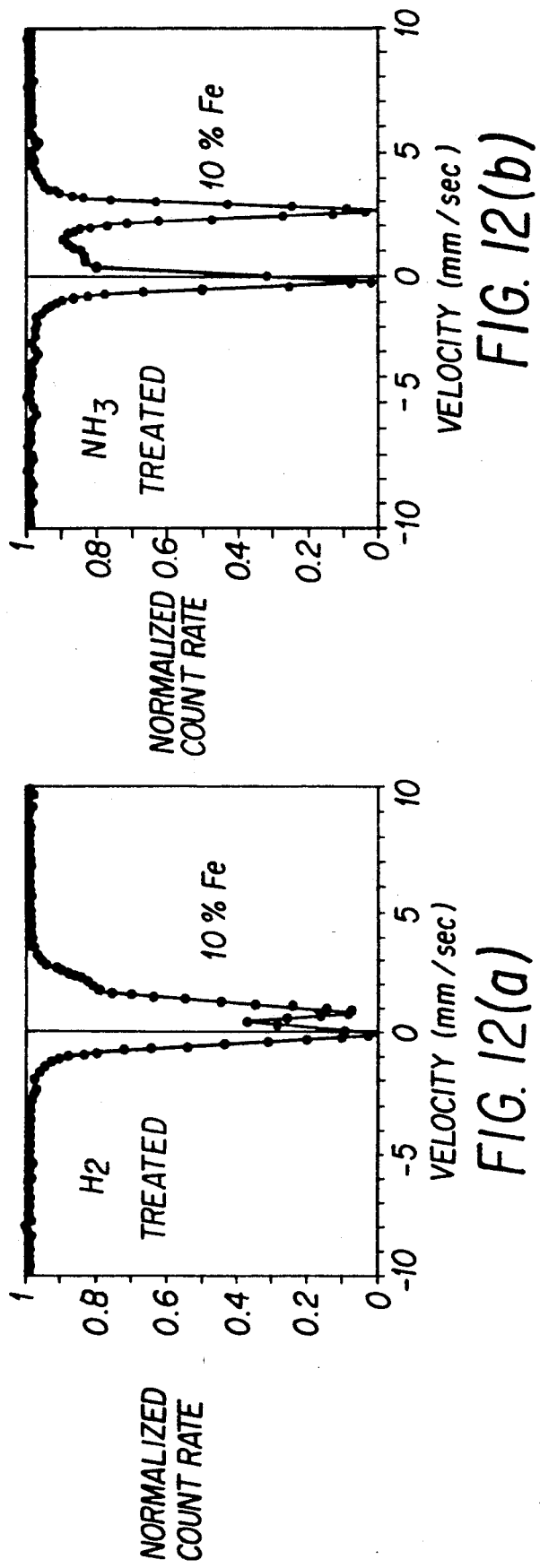

PROCESS FOR THE CONTROLLED PREPARATION OF A COMPOSITE OF ULTRAFINE MAGNETIC PARTICLES HOMOGENEOUSLY DISPERSED IN A DIELECTRIC MATRIX

FIELD OF THE INVENTION

The present invention relates to a process for forming bulk materials having magnetic particles dispersed in a non-magnetic matrix.

BACKGROUND OF THE INVENTION

Composite "granular metals" have been prepared by co-evaporating an immiscible metal and a non-metal under properly controlled conditions onto a suitable substrate to form an intimate mixture of the two constituent phases where the particle size of the metallic phase is of the order of nanometers. These composite materials exhibit properties which are not only related to the properties of the constituent phases but are also strongly composition and particle-size dependent. However, the nature of the co-evaporation procedure makes it most suitable for the production of thin films of the composite material.

SUMMARY OF THE INVENTION

The present invention is directed to the synthesis of bulk materials with very fine dispersions of metallic phases in a dielectric matrix. Practical applications for such bulk materials include high density magnetic recording media which require magnetic particles of ultrafine diameter. Bulk materials with high electrical resistivity may be used as replacements for ferrites in microwave components such as filters and resonators. Magneto-optic devices, using Kerr and Farraday effects, e.g., high resolution information storage and retrieval media, may advantageously use such bulk materials. Also, bulk materials as described above may be used in levitation devices such as magnetic bearings and as anti-radar coatings.

It is an object of the present invention to provide bulk materials with very fine dispersions of metallic phases in dielectric matrices.

It is further an object of the present invention to provide a metallic phase in a dielectric matrix wherein the particle size of the metallic phase is of the order of nanometers.

It is further an object of the present invention to provide a process of producing finely divided magnetic particles in a bulk non-magnetic matrix.

It is further an object of the present invention to provide a process for producing finely divided magnetic particles having a controlled magnetic particle size.

It is further an object of the present invention to provide a process which allows control over the magnetic state of magnetic particles during the synthesis of the particles in a non-magnetic matrix.

The present invention provides a process wherein finely divided magnetic particles are generated within a bulk nonmagnetic matrix so that the magnetic particle size and the magnetic state of the particles are controlled during synthesis through low temperature polymerization and oxidation and reduction reactions.

BRIEF DESCRIPTION OF THE DRAWINGS

FIG. 12 shows room temperature Mössbauer patterns measured for sample 10A following treatments in (a) Hydrogen and (b) ammonia atmospheres;

DESCRIPTION OF THE INVENTION

Figure 1:
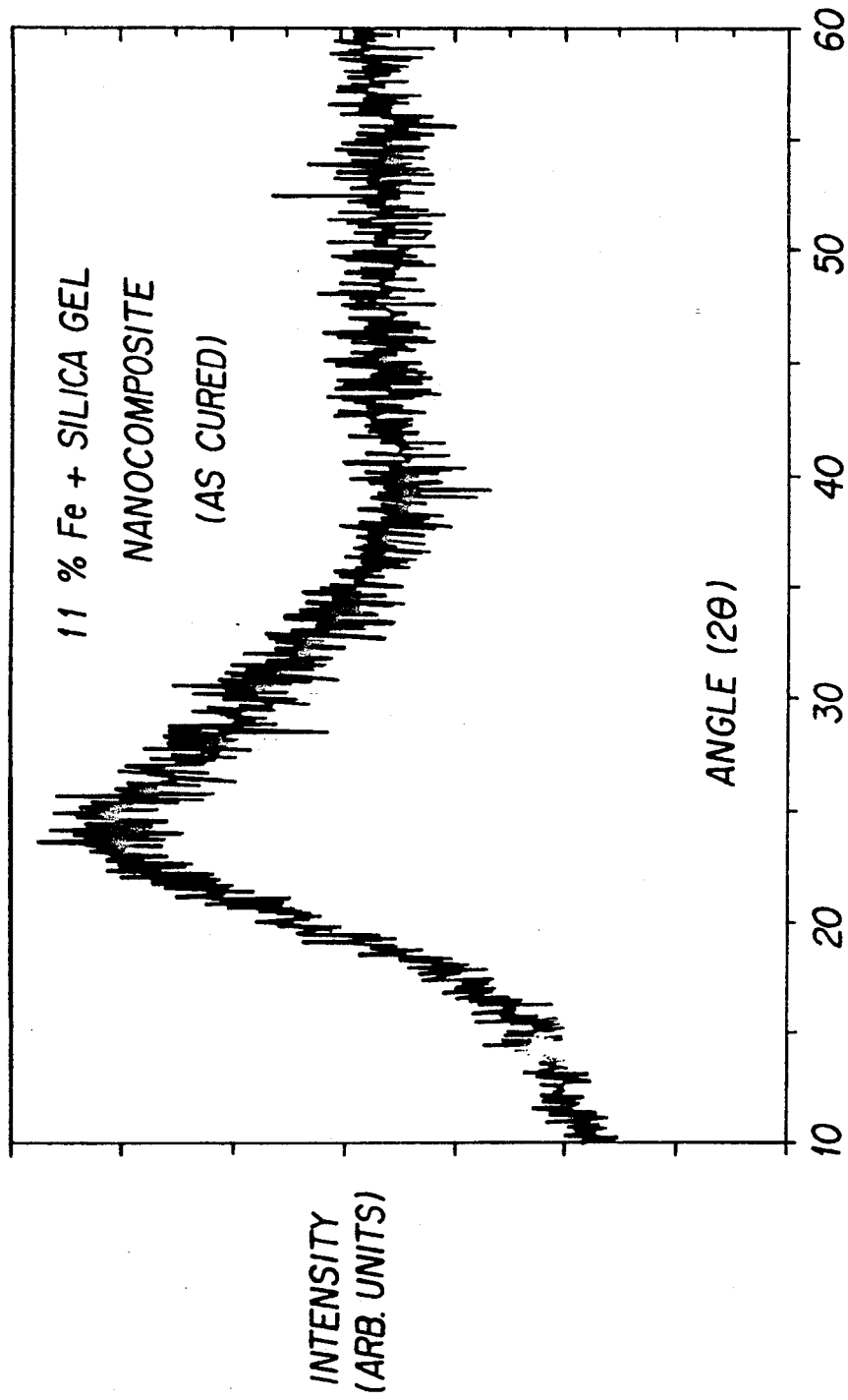
FIG. 1 shows an x-ray diffraction pattern for an as-cured 11% Fe+silica gel nanocomposite.

According to the present invention, a process for producing bulk quantities of an iron-silica gel composite with control over the particle size, form, and magnetic state of the iron is provided. The process involves low temperature polymerization of a silicon alkoxide, a ferric compound, e.g., ferric nitrate, and water, generally under the influence of a catalyst. The chemical and magnetic states of the iron in the resultant composite can be modified in situ by exposure to suitable oxidizing or reducing agents at temperatures under 400° C. At these low temperatures, the formation of undesirable and/or non-magnetic phases such as $Fe_2SiO_4$ (fayalite) can be avoided.

According to the present invention, many different silicon alkoxides may be employed. Tetramethylorthosilicate (TMOS), tetraethylorthosilicate (TEOS), tetrapropylorthosilicate and tetraisopropylorthosilicate or mixtures thereof are preferred, although other silicon alkoxides may be used depending upon the specific application. TEOS is preferred for many applications. These silicon alkoxides provide a soluble form of silicon without any water or hydroxy groups. Thus, a controlled hydrolyzed silicon product is achievable. An ethanolic solution of the silicon alkoxide provides a soluble form of unhydrolyzed silicon. Resulting matrices are generally vitreous in nature. Porous monoliths of varying sizes and shapes may be formed from the hydrolyzed product which consists of a form of hydrous silicon oxide. When other metals are used instead of silicon the hydrolyzed product consists of a form of hydrous metal oxide. Generally, an HF catalyst is used to catalyze the reactions.

According to the present invention, ferric nitrate is preferred as the source of iron for the matrix. At moderate temperatures, the ferric nitrate decomposes leaving iron oxides as a non-volatile reaction product. The decomposition of the ferric nitrate generally begins around 250° C., depending upon process conditions. Iron chlorides may also be used, however, the possibility that some chloride will remain in the matrix should be recognized.

According to one example of the present invention, a solution of a silicon alkoxide, an alcohol (preferably ethanol) and a small amount of an HF catalyst is prepared. The solution is then combined with an appropriate amount of an iron nitrate composition, preferably iron nitrate nonahydrate [$Fe(NO_3)_3 \cdot 9H_2O$], to form a homogeneous solution, which is then poured into a mold and allowed to gel, taking the form of the mold. Due to shrinkage of the gel while curing, the mold dimensions must be made oversized to provide an end product of desired dimensions. When the gel is properly cured, a transparent amber shaped monolith is obtained.

Through the process of the present invention, very high loadings of magnetic components can be realized in non-magnetic matrices. Materials with as much as 40 weight % Fe in $SiO_2$ can be synthesized, and higher iron loadings are possible and are considered to be within the scope of the present invention.

The as-cured gel is paramagnetic. Through saturation with reducing, nitriding or oxidizing agents, preferably in gaseous form, the gel may be processed to provide superparamagnetic, ferromagnetic and ferrimagnetic iron compounds in nonmagnetic matrices. Through manipulation of matrix gelation chemistry, the present invention provides a process which enables selection of the magnetic particle size and the related matrix pore size. Iron particles as small as 50 Angstroms can be prepared in accordance with the present invention, and the synthesis of even smaller particles is within the scope of this invention.

EXAMPLE

An iron-silica gel composite is chosen as a prototype system to demonstrate an embodiment of the present invention. A paramagnetic precursory material was synthesized by preparing a solution of tetraethylorthosilicate (TEOS), ethanol and 48% aqueous HF in the ratios of 1:1:0.014 respectively. This solution was combined with an appropriate amount of iron nitrate nonahydrate, [$Fe(NO_3)_3 \cdot 9H_2O$] to give an iron content o with respect to the final anticipated product of $SiO_2+Fe$. The total water/TEOS ratio was varied from 5.0 to 9.2. Systems with up to 40 weight % Fe+60 weight % $SiO_2$ were prepared in a similar fashion.

The homogeneous solutions ;ere poured into shallow, covered dishes and allowed to gel. Systems with 10% Fe required 12 hours for gelling while the 30% Fe systems required as long as six days. The gelled materials were allowed to cure at 25° C. over a period of several weeks, generally resulting in collections of clear, hard amber shards as the volatiles evaporated.

While not wishing to be bound by any hypothesis the present applicants believe that the reaction occurs as follows:

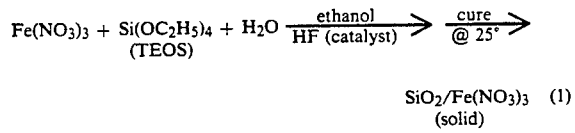

$$Fe(NO_3)_3 + \underset{(TEOS)}{Si(OC_2H_5)_4} + H_2O \xrightarrow[\text{HF (catalyst)}]{\text{ethanol}} \xrightarrow[\text{@ 25°}]{\text{cure}}$$

$$\underset{\text{(solid)}}{SiO_2/Fe(NO_3)_3} \quad (1)$$

An examination of these cured materials by Mössbauer spectroscopy indicated iron particles less than 200 Å in diameter; scanning electron microscopy (SEM) suggested an interesting relationship between Fe particle size and matrix pore size. Interpretation of the data suggests that larger iron particles are found with concomitantly larger matrix pore sizes. The control of matrix pore size is therefore a means to control the size of the iron particles. Matrix pore size can be manipulated through variations in the gelation chemistry. Moreover, it is possible to produce shaped monolithic forms of the gelled materials by using super critical fluid drying or other controlled gel curing techniques.

It is shown through magnetization measurements using a vibrating sample magnetometer (VSM) that by changing the chemical form of the iron within the composite, several different magnetic states can be produced. The as-cured gel is paramagnetic. According to the present invention, the following processes allow for selection of the magnetic state. Infusion of the composite with hydrogen and heating to 375° C. results in a superparamagnetic material without any increase in the particle size of the iron-containing regions. Heating further in the presence of a nitriding agent, preferably ammonia, creates a ferromagnetic material. Similarly, infusion of the as-cured gel with )2 and heating changes the form of the iron in the composite to $Fe_2O_3$, which is ferrimagnetic. Further heating with "wet" $H_2$ creates superparamagnetic $Fe_3O_4$-containing material. By keeping processing temperatures below 400° C., reactions between the Fe and the silica matrix to form undesirable phases such as $Fe_2SiO_4$ (fayalite) can be minimized.

Control of the magnetic state of the particles by changing their chemical form according to the present invention is outlined schematically as follows:

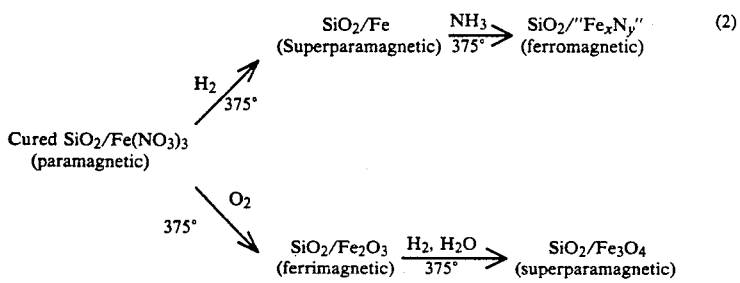

(2)

The present invention can be extended to other magnetic/ dielectric composite systems, e.g., Co or Ni in matrices such as gelled $Al_2O_3$, $TiO_2$ or $ZrO_2$. Further extensions to magnetic alloy systems such as Nd/Fe, Ni/Co, Fe/B, Fe/Co or Tb/Fe in these matrices are also possible. In such cases, a metal alkoxide is polymerized in solution with a magnetic compound to form a gel. The gel is cured to form a porous hydrous metal oxide product which contains the magnetic component.

For several samples, a drop of the initial liquid mixture was applied to a Au TEM (Transmission Electron Microscope) grid. This grid was attached to a teflon holder placed inside the loosely covered dish containing the remainder of the solution. Consequently, the nanocomposites formed on the TEM grids and from the bulk solutions were cured in air under the same conditions.

X-ray diffraction and magnetic susceptibility measurements were performed on powders of these solids, and Mössbauer spectra were measured on powdered compacts. Magnetization measurements, M (per unit mass of sample), were performed as a function of magnetic field ($-10$ kOe $<$ H $<$ $+10$ kOe) and temperature (10 K $<$ T $<$ 300 K) using a vibrating sample magnetometer. The Mössbauer effect measurements were made using the sample as the absorber and a 0.5 mCi $^{57}$Co in Rh source. $Fe_2O_3$ was used to calibrate the velocity scale of the Mössbauer equipment, and zero velocity is the center of a pure Fe spectrum. Transmission electron microscope observations were performed at 300 keV in a high resolution TEM.

Figure 2:
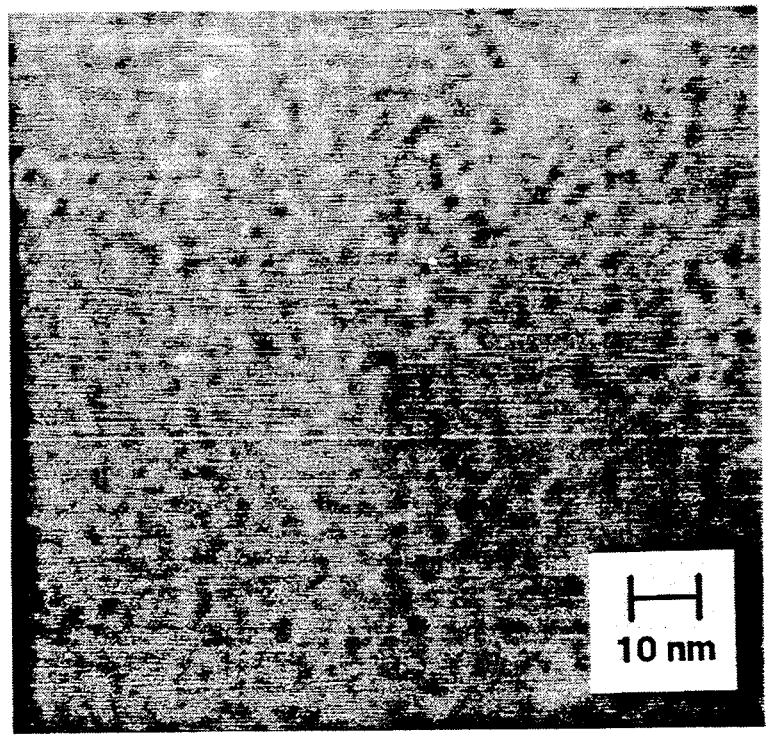
FIG. 2 shows a TEM micrograph of the hydrogen-treated 11% Fe+silica gel nanocomposite.

FIG. 1 shows a typical x-ray diffraction pattern measured for the iron/silica gel nanocomposites after curing. The patterns are characterized by the presence of two broad scattering bands similar to that observed for silica gel. The Mössbauer spectra for these materials at room temperature are characterized by the presence of a strong central doublet with a small 0.4 mm/sec isomer shift. The disappearance of the central doublet and development of a multiple line spectrum extending to high velocities on temperature decrease indicates that the sizes of the iron-containing regions in these materials are very small ($<20$ nm). The small size of these regions probably accounts for the lack of strong Bragg scattering peaks from them in the x-ray spectra. The iron in these cured nanocomposites is expected to occur either as hexaquoiron III, $[(H_2O)_6Fe]^{3+}$, or in its hydrolyzed forms, $[(H_2O)_5FeOH]^{2+}$ and $[(H_2O)_4Fe(OH)_2]^{1+}$. The x-ray diffraction spectra for these forms are comprised of multiple closely spaced lines. When broadened by the small sizes of these regions, these patterns would also be expected to be diffused in the cured nanocomposites. The small particle size of the iron containing regions may actually be observed in the transmission electron microscope. The TEM micrograph of FIG. 2 shows the morphology of an 11% Fe nanocomposite which had been heated to 350° C. in a hydrogen atmosphere for 12 hours following its initial drying. Those regions in the material containing Fe, the more electron-absorbent species (higher atomic #) element, will appear dark under transmission. The micrograph shows that this material is indeed a composite material containing nanometer-sized regions (200–300 Å in diameter) of at least two different phases. Mössbauer effect measurements (FIG. 3) reveal that the type of thermal treatment given this particular sample changes the form of the Fe in the material, and may even increase its size.

Figure 3B:
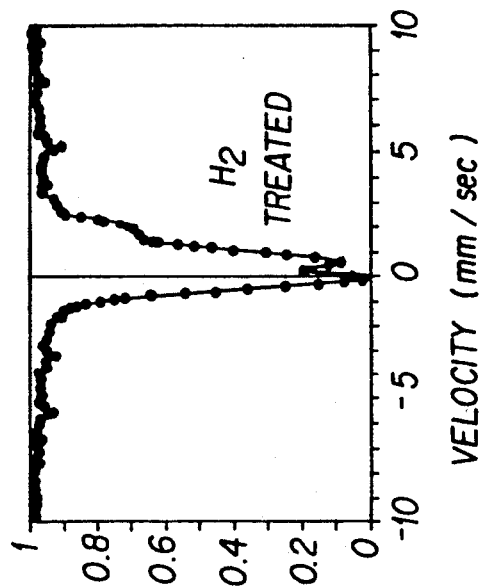
FIG. 3 shows a Mössbauer spectra for a 25% Fe+silica gel nanocomposite after (a) curing and (b) treating in a hydrogen atmosphere.
Figure 3A:
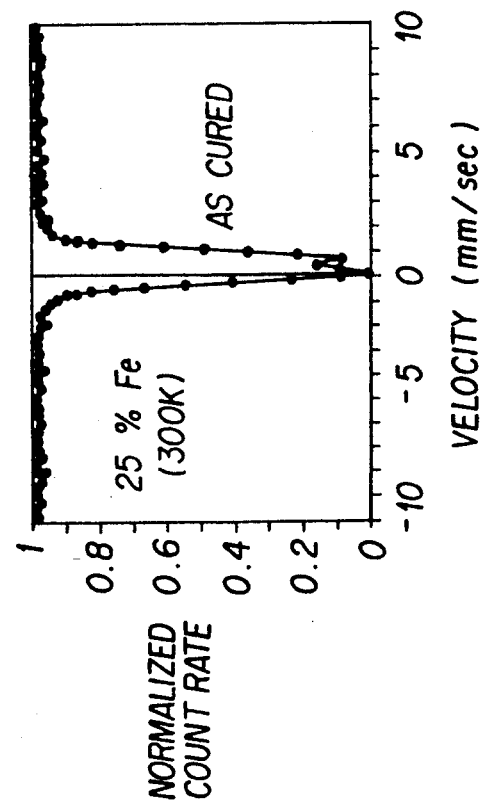

FIG. 3 shows the room temperature Mössbauer effect spectrum for a nanocomposite containing 25% Fe after (a) curing and (b) heat treating at 380° C. in a hydrogen atmosphere for 12 hours. Unless otherwise noted, these patterns are representative of those measured on all samples with similar preparative histories described in the present paper. An attempt was made to prepare the same type of Fe+silica gel nanocomposite by first preparing the silica gel and infiltrating the iron nitrate solution afterwards. In this case the Mössbauer pattern was similar in shape to FIG. 3a, but indicated 40% less iron was introduced to the material. The characteristic central doublet in FIG. 3a comes from very small magnetic Fe-containing regions above their blocking temperature. The hydrogen treatment resulted primarily in a broadened central doublet with an admixture of a less intense peak having a greater isomer shift. For samples containing 25% or more Fe, the Mössbauer pattern at room temperature in addition possessed a very weak multiple line spectrum after hydrogen treating. The magnetic hyperfine field (H) for this multiple line spectrum is 330 kOe, that of pure Fe.

Figure 4:
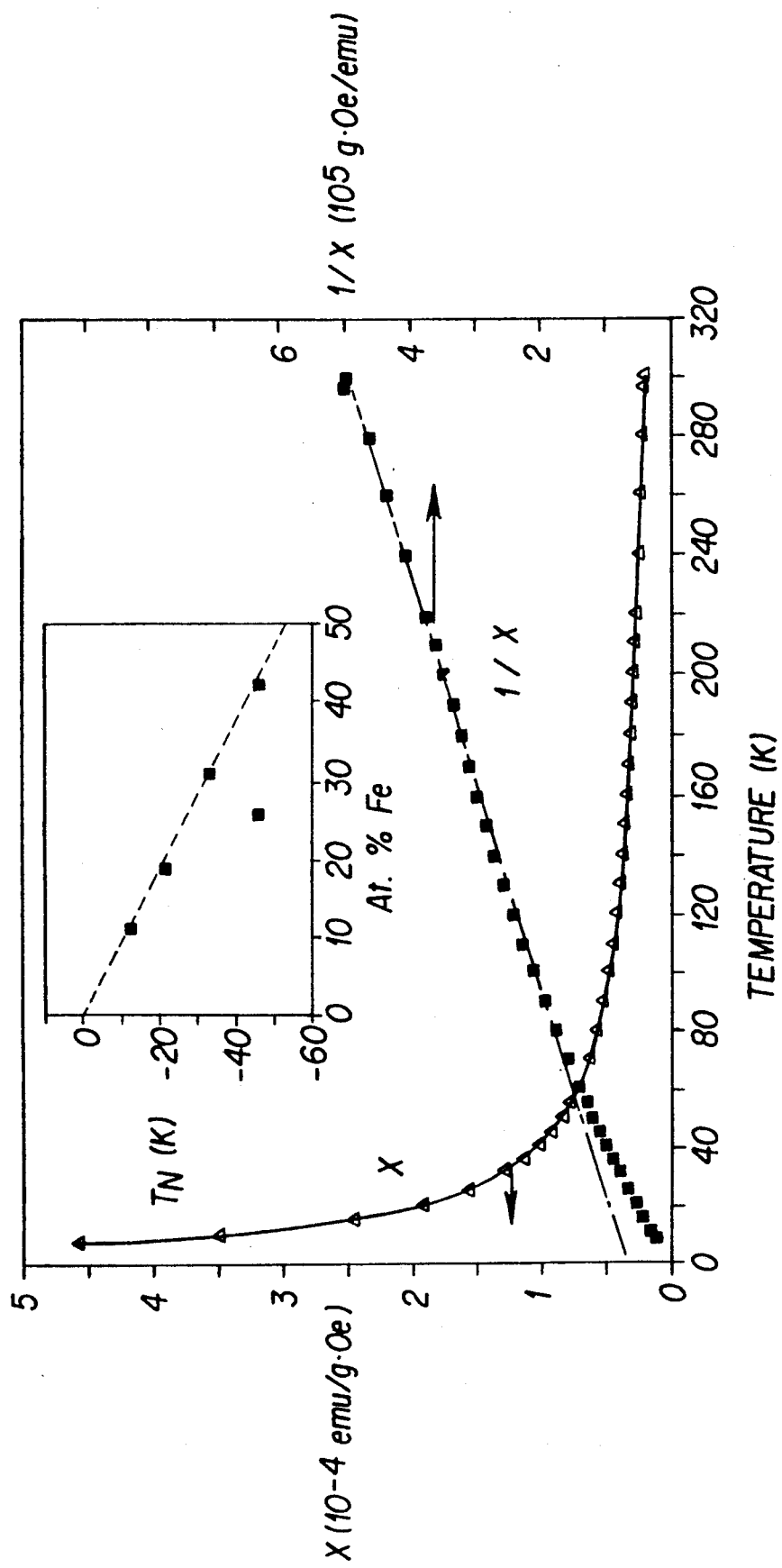
FIG. 4 shows the magnetic susceptibility, $\chi$, and $1/\chi$ vs. temperature, T, data for a 40% Fe+silica gel nanocomposite wherein the dot-dashed line is a least squares fit to the $1/\chi$ data above 90 K and follows the relationship $1/\chi = 6536 + 142.7*T$ and wherein the inset shows the composition dependence of the intercept temperature, $T_n$.

The magnetization was measured as a function of temperature and applied field for samples containing 11, 18, 25, 30 and 40% Fe. All of these samples possessed only small particles as revealed by Mössbauer spectra similar to that shown in FIG. 3a after curing. For all samples, all isotherms between 10 K and 300 K were straight lines, indicating all these materials were either antiferromagnetic or paramagnetic in this temperature range. The magnetic susceptibility, $\chi$, for the 11% Fe sample at room temperature was $1.2\times10^{-5}$ emu/g•Oe; at this temperature increased with the iron content roughly at a rate of $2.74\times10^{-7}$ (emu/g•Oe)/at % Fe. On decreasing temperature, the magnetic susceptibility for all the samples continuously increased, reaching values at 10 K, 20 times larger than those at 300 K. FIG. shows this temperature dependence (which is similar for all cured samples) for the 40% Fe composition. Significant negative deviations are apparent in the $1/\chi$ plot (FIG. 4) for this sample at T$<$100 K. Similar deviations from Curie-Weiss behavior are observed in the related class for ferrite materials above their Curie points. The extrapolated high temperature behavior indicates a negative intercept ($T_N$) of the temperature axis, suggesting the occurrence of antiferromagnetic interactions in this material, with a Néel temperature of 45 K. Both the non-linearity of the $1/\chi$ vs T graphs for T<100° K and the negative values of $T_N$ were found for all the cured Fe+silica gel nanocomposites. $T_N$ varied linearly with the Fe content at a rate of $\sim -1.07$ K/at. % Fe, extrapolating to zero for pure silica gel (Inset, FIG. 4).

Figure 5:
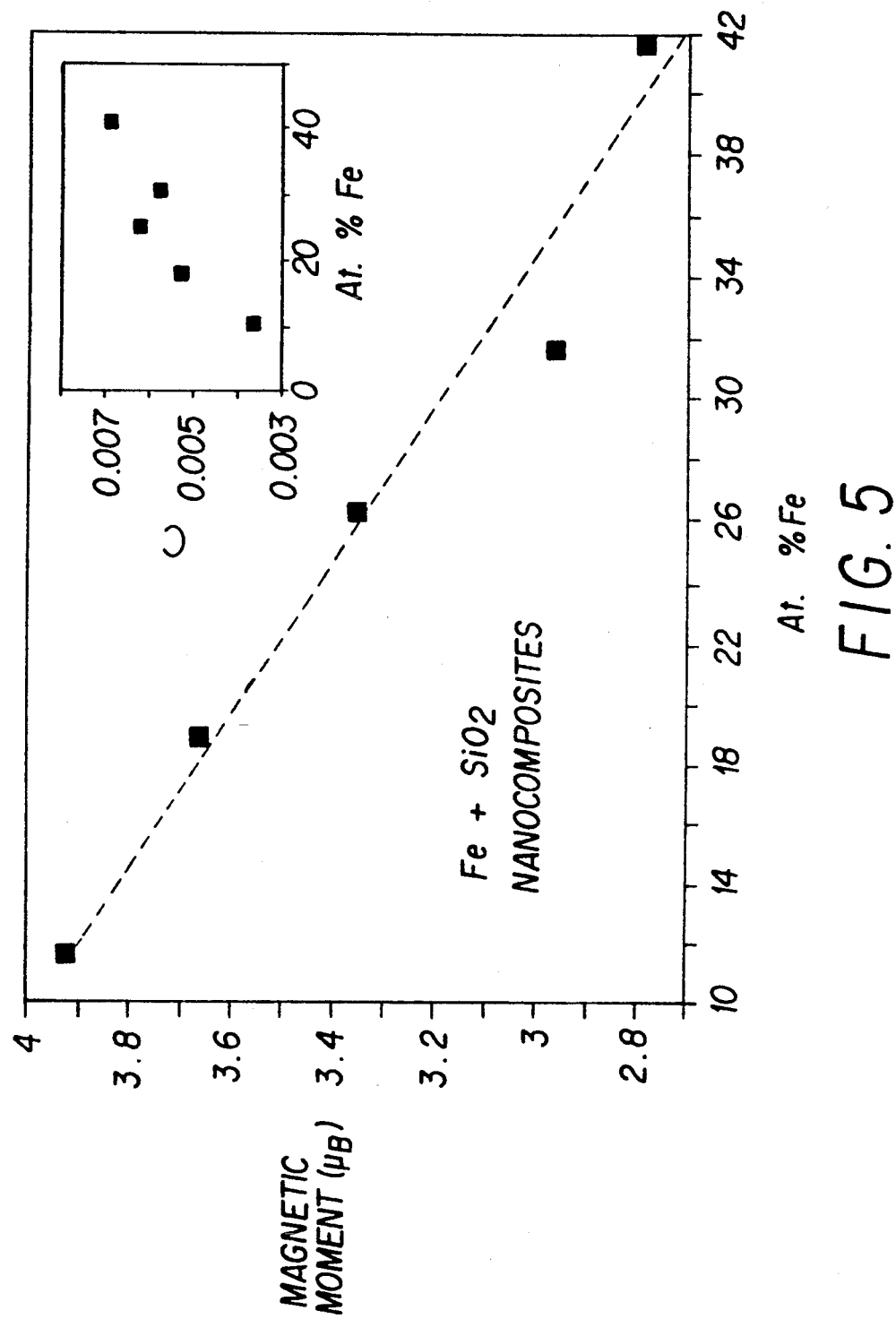
FIG. 5 shows the magnetic moment per Fe atom and Curie constant, C, (inset) vs. Fe content in the cured Fe+silica gel nanocomposites.

The reciprocal of the slope of the $1/\chi$ vs T graph is the Curie constant (C) for the material. This constant is proportional to the number of magnetic moments per unit volume, n, and the magnitude of the magnetic moment, $\chi$, of the magnetic species: $C(emu \cdot K/g \cdot Oe) = n\mu^2/3\rho k_B$, where $\rho$ is the density of the material and $k_B$ is the Boltzmann constant. For the Fe+silica gel nanocomposites C increased with Fe content as shown in the inset of FIG. 5. Under the assumption that only the Fe atom carries a magnetic moment, and taking into account the fact that only a fraction of the sample is iron, the magnetic moment per Fe atom was calculated from the high temperature Curie constants of each sample and displayed in units of Bohr magnetons, $\mu_B$, in FIG. 5. Note that the zero % iron extrapolated value for the magnetic moment per iron atom is 4.4 $\mu_B$, a value in between the 4 $\mu_B$ and 5 $\mu_B$ values expected for Fe in the ionic forms, $Fe^{2+}$ and $Fe^{3+}$ respectively. Certainly, a large portion of the iron initially exists in ionic form in these nanocomposites. The magnetic moment, however, per Fe atom decreases (at a rate of $\sim -0.04$ $\mu_B$/at % Fe) as these materials become more concentrated in iron. This result possibly indicates an increase in the number of antiferromagnetic interactions between the atoms as their distance of separation decreases. It is reasonable to postulate that the iron ions may be bonded to each other through the oxygen atoms in hydroxyl bridges (e.g. Fe—OH—Fe). In the related class of materials, ferrites, the magnetic interaction between Fe atoms is also via an oxygen atom. In this case, this interaction is known to be antiferromagnetic.

Figure 6:
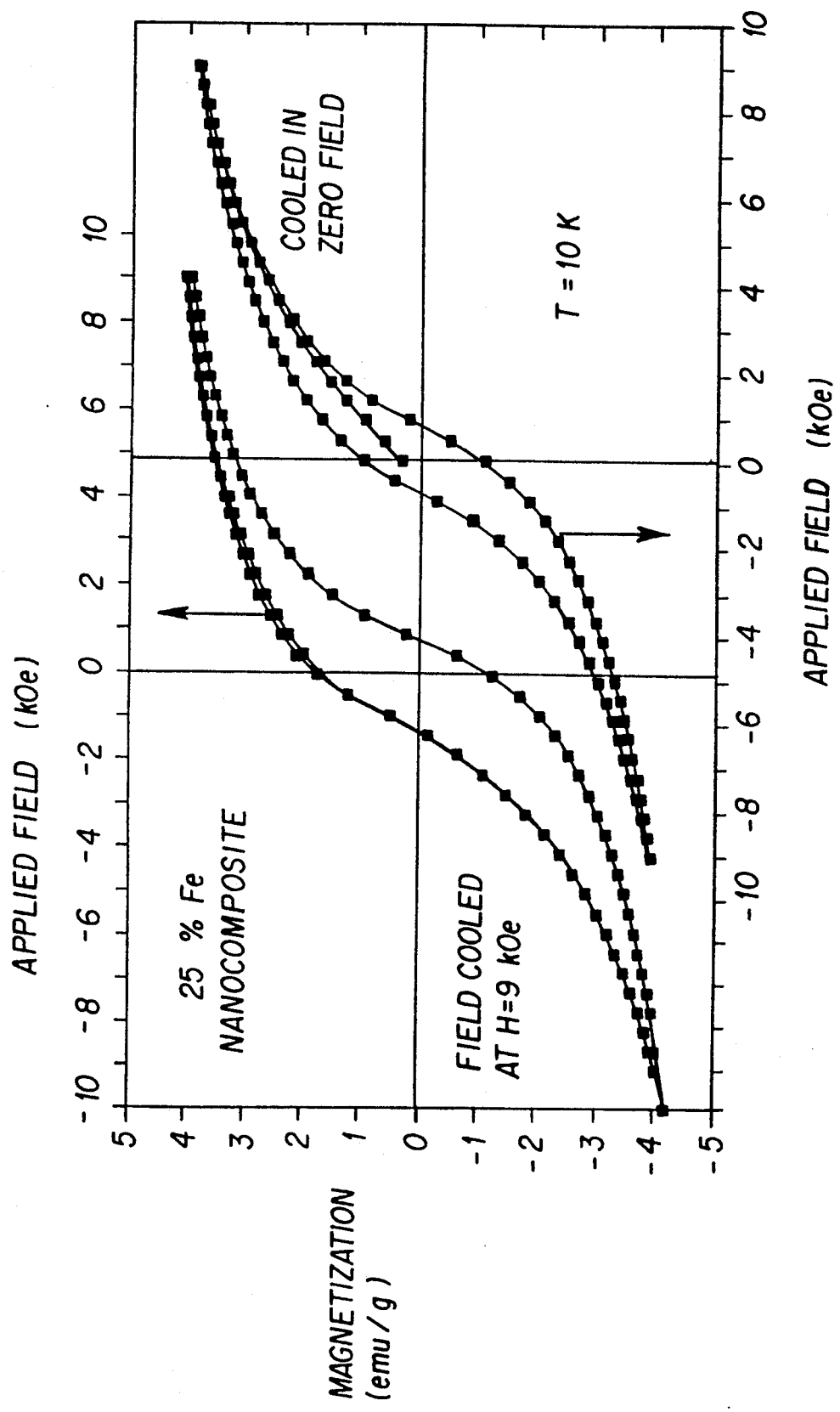
FIG. 6 shows magnetization vs. Field data for the hydrogen-treated 25% Fe+silica gel nanocomposite at 10K, measured after cooling to this temperature in zero applied field and after cooling in a 9 kOe field.

After treating the nanocomposites with hydrogen for 20 hours at $\sim 380°$ C., the magnetic state of the material was changed dramatically. The 11% Fe material became superparamagnetic at room temperature and displayed magnetic spin glass behavior at low temperatures, including both thermomagnetic history effects and displaced hysteresis loops. According to the present invention, nanocomposite materials with 18–30% Fe were ferromagnetic at room temperature, possessing narrow hysteresis loops on cycling the field. The saturation magnetization of these materials at 300 K increased with the Fe content from 1.5 emu/g to 11 emu/g. Even though the high temperature state of these more Fe-concentrated materials was ferromagnetic, they still transformed to the spin glass state on cooling to 10 K. This direct ferromagnetic-to-spin glass transformation is similar to that observed in the Fe-Cr and Fe-Al systems (alloys in the latter being prototypical of the reentrant spin glass). For the 25% Fe+silica gel nanocomposite, FIG. 6 shows a displaced hysteresis loop (from the origin along the field axis) measured at 10 K after cooling the sample in a 9 kOe applied field. Comparison with the non-displaced hysteresis loop shown in FIG. 6 (measured at the same temperature after cooling to 10 K in zero applied field) shows the existence of unidirectional anisotropy and spin glass behavior in this material. The magnitude of the hysteresis loop displacement, measured at 10 K after field cooling in a 9 kOe field, linearly decreased with Fe addition, extrapolating to zero at $\sim 34$ at % Fe. At this composition, the spin glass freezing temperature has apparently decreased to near 10 K.

Scanning electron microscope (SEM) observations were performed at either 15 or 25 kV on freshly fractured surfaces of the hardened gel. Prior to observation, a thin Au coating was sputtered on top of the specimen in order to eliminate charging effects.

All of the specimens possessed x-ray diffraction patterns characterized by the presence of two broad scattering bands (centered at $\sim 24$ and $\sim 47$ degrees 2 $\theta$) similar to that observed for amorphous materials. The low temperature Mössbauer data presented later shows that the Fe-containing regions in these samples, if crystalline, are too small to give intense Bragg diffraction peaks.

Figure 7B:
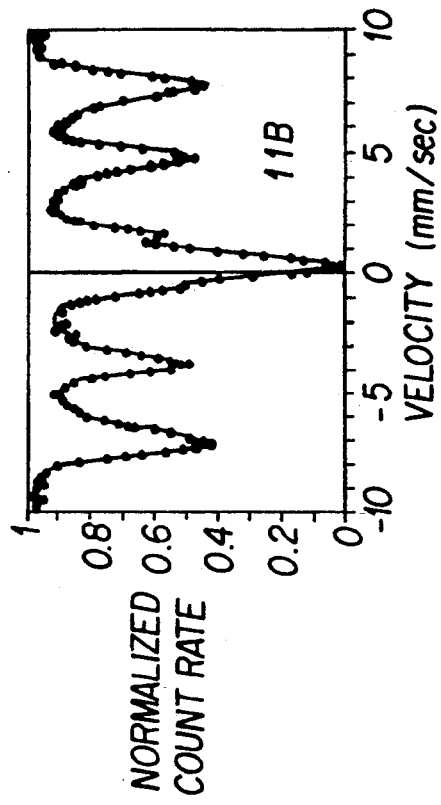
FIG. 7 shows room temperature Mössbauer patterns for (a) sample 10A and (b) sample 11B.

The room temperature Mössbauer patterns measured for the air dried iron/silica gel nanocomposites were of the two basic types shown in FIG. 7. Either they possessed only a strong central doublet with a small 0.4 mm/sec isomer shift or they possessed this same central doublet in combination with a broad multiple line spectrum extending to high velocities indicating the presence of magnetically ordered material.

Figure 8A:
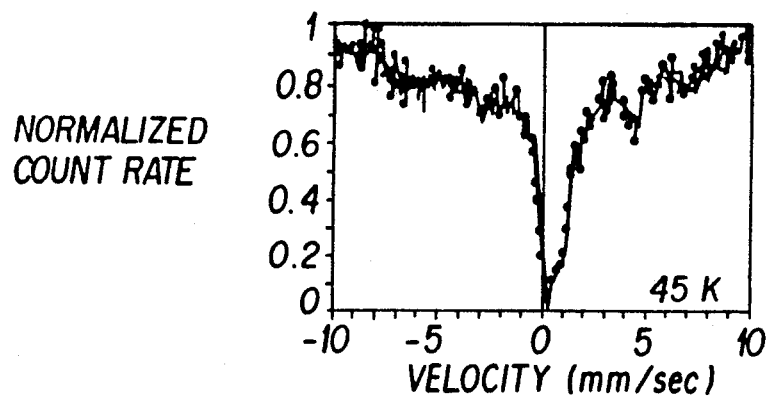
FIG. 8 shows Mössbauer patterns measured for the 10% Fe sample 10A at (a) 45 K, (b) 20 K, and (c) 4.2 K.
Figure 8B:
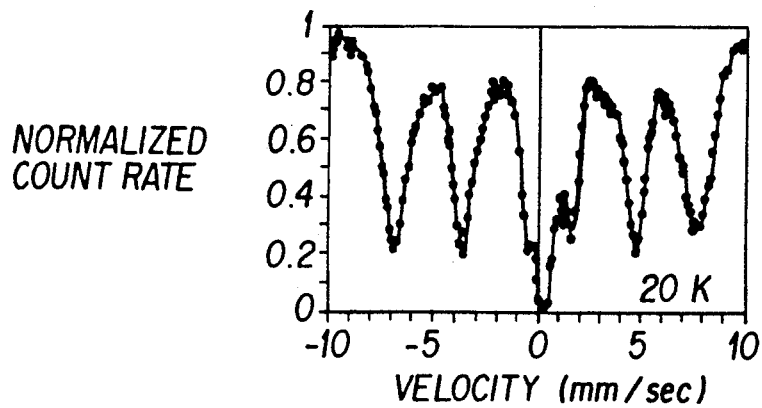
Figure 8C:
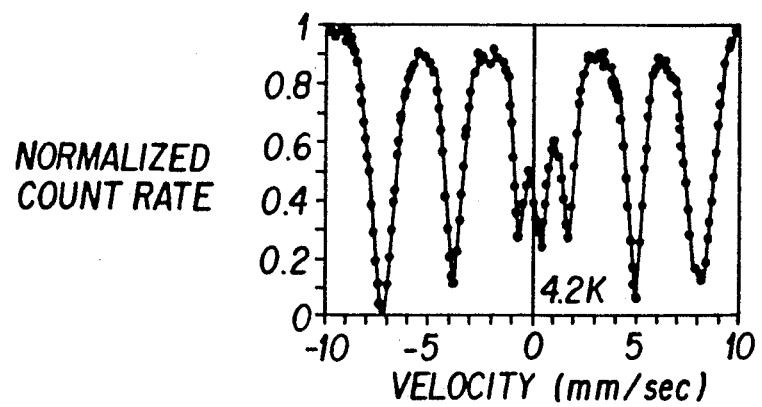
Figure 9:
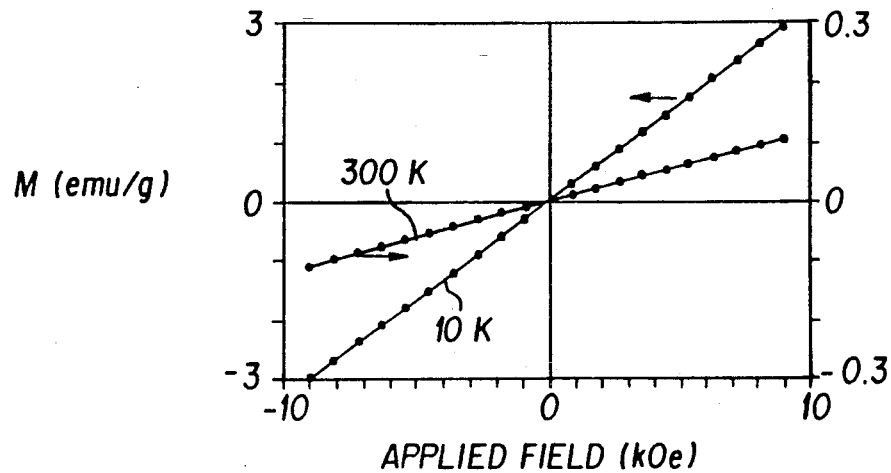
FIG. 9 shows magnetization vs. applied field data for sample 10A measured as the field was cycled between +10 kOe and −10 kOe at room temperature (open symbols) and 10 K (filled symbols)
Figure 10:
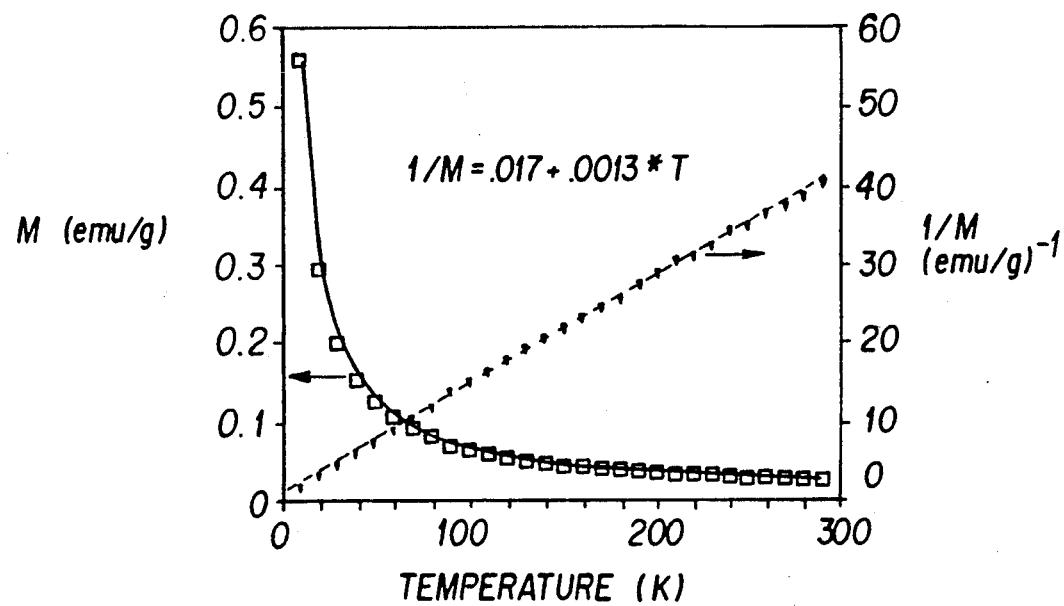
FIG. 10 shows magnetization, M, (open symbols) and reciprocal magnetization (filled symbols) vs. temperature data for sample 10A measured during cooling in a 2 kOe applied field.

The magnetic hyperfine field (H) for this multiple line spectrum, 453 kOe, is smaller than the 517 kOe field of $Fe_2O_3$, larger than the 330 kOe field for pure iron, but close to the 450 kOe field commonly observed for iron compounds in which the iron occurs as $Fe^{2+}$. The central doublet found in all the room temperature spectra comes from very small magnetic regions (estimated diameters <200 Å) above their blocking temperatures similar to submicron particles of $Fe_2O_3$ and for nanocomposites of $Ag+Fe_3O_4$. This particle size effect is shown very dramatically in the sequence of Mössbauer spectra shown in FIG. 8 for specimen 10A measured at reduced temperatures. At 45 K the spectra shown in FIG. 7a begins to show a magnetic component. By 20 K, the magnetic component is well developed; and the 4.2 K spectrum shows that the magnetic component grows at the expense of the high temperature central doublet. The positions of the multiple line spectrum at 4.2 K (H$\approx$470 kOe) in this sample are very close to those observed in the multiple line spectra measured at room temperature for those samples possessing large Fe-containing particles. FIGS. 9 and 10 show that the magnetic hyperfine field observation in sample 10A at low temperatures is not due to the presence of a ferromagnetic transition. This 10% Fe sample possesses a linear field dependence at both room temperature and 10 K indicating it is paramagnetic (on the time scale, $\sim 1$ sec, of the magnetization measurement) in this temperature region, and there is no discontinuity in the temperature dependence of the magnetization (at 2 kOe field) down to 10 K. The magnetic hyperfine field component in the Mössbauer spectra of FIG. 8 reflects the appearance at low temperatures of cooperative magnetic behavior in sample 10A, but only on a very short time scale ($\leq 10^{-7}$ sec, $\sim$ the Larmor precession period of the $^{57}Fe$ nuclei).

FIG. 10 shows magnetization, M, (open symbols) and reciprocal magnetization (filled symbols) vs. temperature data for sample 10A measured during cooling in a kOe applied field. The dashed line is a least squares fit of the T>50 K data to a Curie-Weiss law. Note that all the 1/M data points fall below this line for T<60 K.

The results shown in FIG. 10 indicate that small negative deviations from Curie-Weiss behavior do occur around 60 K, and the possibility of an antiferromagnetic transition is suggested by the intercept at $\sim -13$ K of the extrapolated high temperature behavior.

Figure 11A:
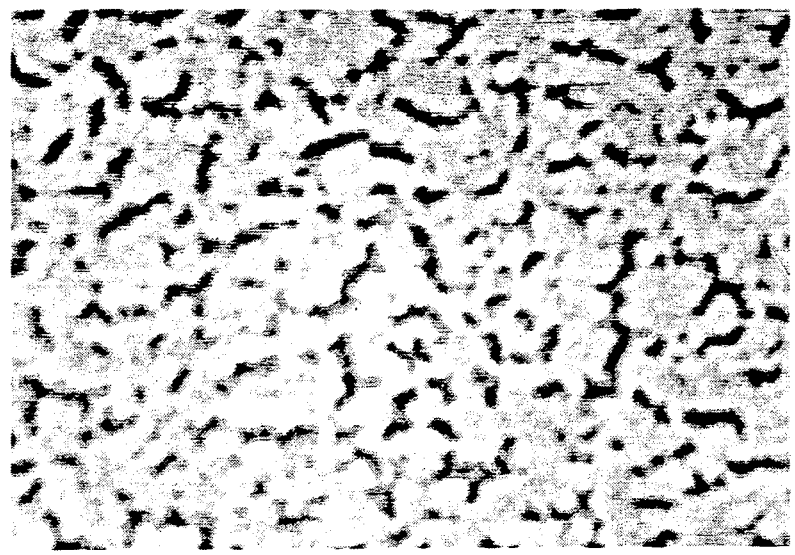
FIG. 11 shows scanning electron micrographs of samples (a)10A and (b)11B taken at 50,000X.

FIG. 11 shows scanning electron micrographs of samples (a) 10A and (b) 11B taken at 50,000x showing the interconnected network of pores (dark) existing throughout the matrix (light) of these materials.

Figure 7A:
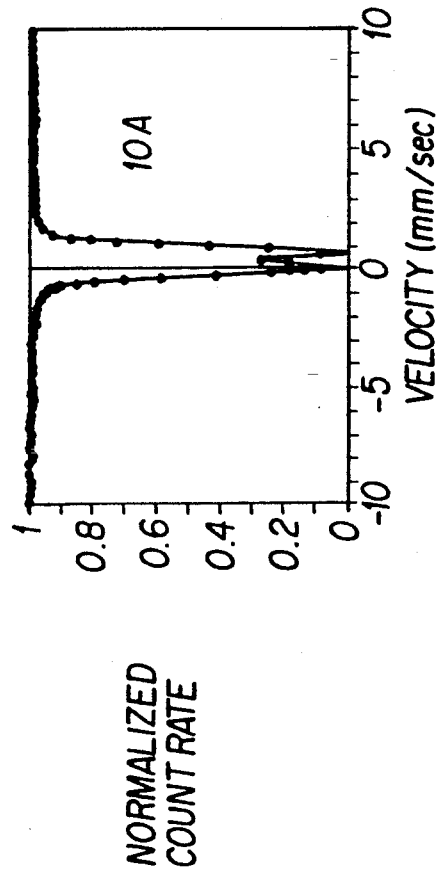
Figure 11B:
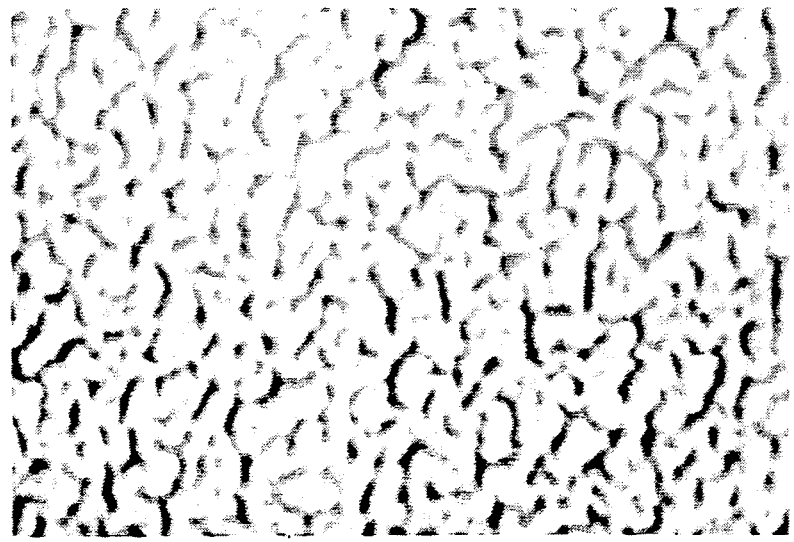

Series A samples containing 25 and 30% Fe possessed identical room temperature Mössbauer spectra to that shown for specimen 10A in FIG. 7a, indicating a small particle size for the Fe-containing regions in these samples. However, larger particle sizes were found to be present in specimen 18A as it possessed a spectra similar to that shown in FIG. 7b. For series B samples, 11B and 18B possessed room temperature spectra containing a magnetically ordered component while that measured for 25B only contained the large central doublet. Consequently, the Fe and $H_2O$ contents of the preparation solutions are not the only parameters affecting the particle size of the iron in these nanocomposites. A correlation, however, was observed between the morphology of the samples and their high temperature Mössbauer patterns. All the materials prepared here possessed an interconnected network of pores throughout the matrix as shown in FIG. 11. However, those materials which possessed large ($\geq 45$ nm) pore diameters as shown in FIG. 11b for sample 11B also possessed Mössbauer spectra with a magnetically ordered component visible at room temperature. If the Fe-containing regions are localized in the pore areas, one might expect their sizes to be proportional to the amount of cation (Fe) in the pores during the drying process and, consequently, to the pore volume. Note from FIG. 11 that even for those materials with large pore size (and therefore possessing "large" iron particle sizes), the particle sizes of the Fe-regions are still too small ($\leq 20$ nm) to be imaged in the conventional SEM.

Evidence was found for localizing the Fe-containing regions in the pore areas by subjecting separate pieces of the dried nanocomposite 10A to treatments in 1 atmosphere of hydrogen gas (378 C. for 20 hours) and 1 atmosphere of $NH_3$ gas (460 C. for 1 hour following the previous hydrogen treatment). Due to the interconnection of the pore areas, any Fe-regions located in these areas would be likely to change their form during these treatments. The Mössbauer spectra for these altered samples, displayed in FIG. 12, indeed show distinct changes in the form of the iron in these nanocomposites. The hydrogen treatment resulted in a pattern with a slightly broadened strong central doublet with an admixture of a less intense peak having a greater isomer shift; the $NH_3$ treated sample resulted in a material primarily possessing a much larger isomer shift of 1.4 mm/sec. At room temperature both of these altered materials possessed increased magnetization values (by factors of 2 and 3 respectively for the $NH_3$ and $H_2$ treated specimens) and changed their magnetic state from paramagnetic to superparamagnetic (see FIG. 13). Even though the Mössbauer pattern for the $H_2$-treated sample was not remarkably different from the untreated sample 10A (FIG. 7a), its magnetic state is quite different. In fact, FIG. 14 shows the $H_2$-treated 10% Fe sample possesses thermomagnetic history effects at temperatures below about 30 K. These effects combined with the observation of a displaced hysteresis loop along the field axis at low temperatures are characteristic of spin glass magnetic behavior. This magnetic behavior results when the magnetic spins on the Fe become frozen in their high temperature orientation when cooled to below their freezing temperature (which in this case is $\sim 30$ K).

Figure 13:
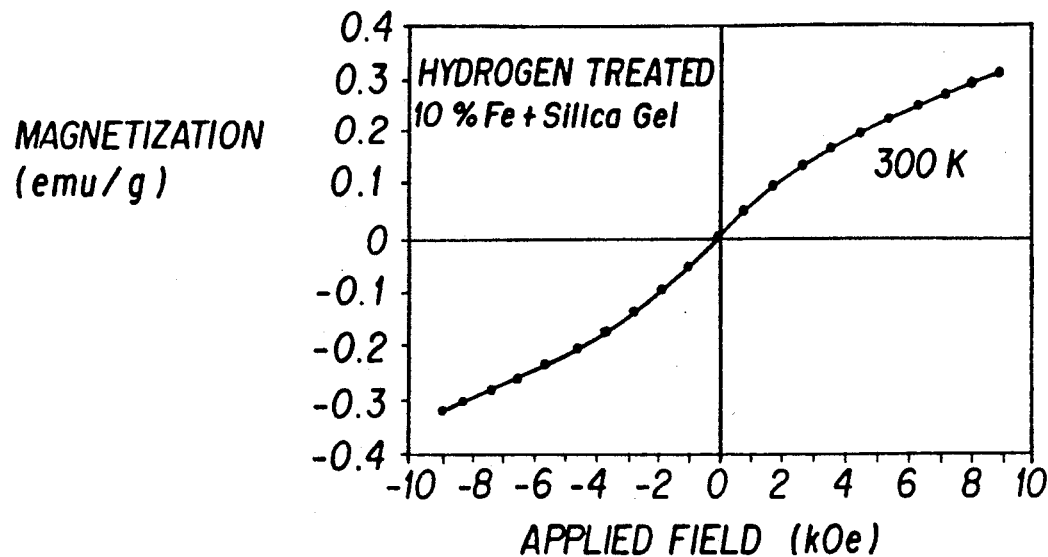
FIG. 13 shows magnetization vs. applied field data for sample 10A at 300 K following a treatment in hydrogen gas.
Figure 14:
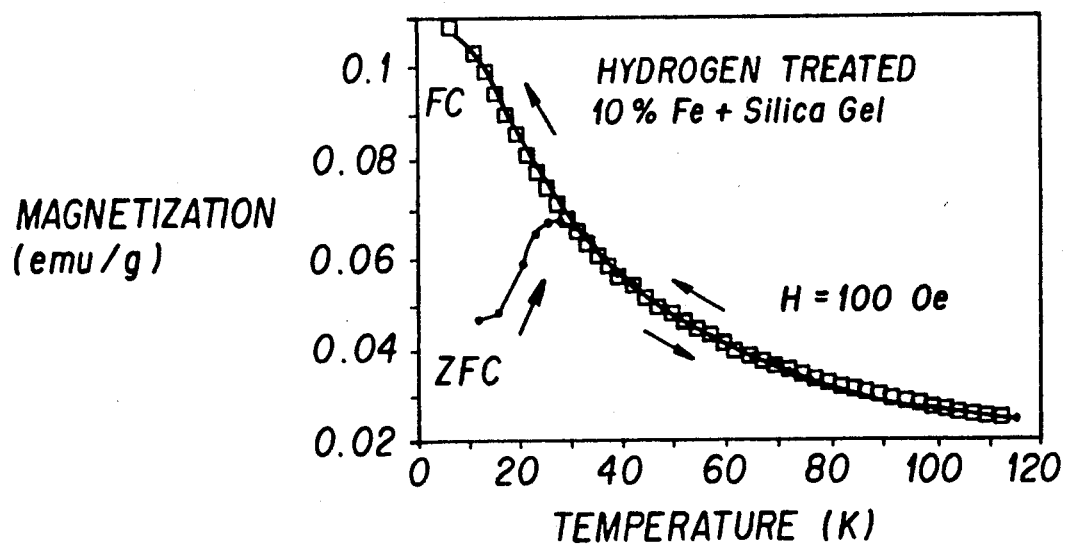
FIG. 14 shows magnetization vs. temperature data at 100 Oe applied field $H_o$ for the $H_2$-treated sample containing 10% Fe as it was (a) cooled in $H_o$ and (b) warmed in $H_o$ following cooling in zero field.

FIG. 13 shows magnetization vs. applied field data for sample 10A at 300 K following a treatment in hydrogen gas. The room temperature data measured for the $NH_3$-treated material looked similar, but with a maximum magnetization at 9 kOe of 0.2 emu/g.

FIG. 14 shows magnetization vs. temperature data at 100 Oe applied field for the $H_2$-treated sample containing 10% Fe measured as it was either (a) cooled in the measuring field (open symbols) or (b) warmed in the measuring field following a cool to the lowest temperature in zero field (filled symbols). Arrows indicate the direction of measurement.

In another aspect of the present invention, a magnetooptical device is provided by forming a flat optical reflector from the material described above. Polarized light is reflected from the reflector surface. Upon application of a magnetic field to the reflector, the polarization of the light may be changed (Kerr effect). Generally, any of the bulk materials produced in accordance with the present invention may be cast into a monolith having the shape of an optical flat. Once cured, the material forms an amber colored glass. Upon reduction with an appropriate chemical agent, the iron in the material is brought into a ferromagnetic state. The reduced material is highly reflective of visible light, particularly when the iron loadings approach 30%. Due to the controlled polarization of the reflected light, applications for high resolution information storage and retrieval are possible.

Alternatively, information storage and retrieval using these materials in the form of an optical window, may be accomplished by using magnetically controlled polarization changes in a transmitted beam of electromagnetic radiation, e.g., light, x-rays, gamma rays, microwaves or radiofrequency waves (Faraday effect).

This class of nanocomposites has an additional potential for use as selective filters for electromagnetic radiation. For example, the as-cured 10% Fe/$SiO_2$ material is amber in color and transparent to visible light. Upon chemical reduction or oxidation the material becomes respectively, either black or orange and is somewhat opaque to visible radiation. This controlled change in both color and in transmissivity is a function of the concentration, ultrafine particle size and chemical state of the iron.

It is to be understood that the present invention is not limited to the specific embodiments described herein. It will be appreciated by those skilled in the art that additions, modifications, substitutions and deletions may be made without departing from the scope of the invention defined in the appended claims.

What is claimed is:

1. A process for synthesizing a bulk material having magnetic particles dispersed in an non-magnetic matrix, comprising the steps of:
   a) polymerizing silicon alkoxide in solution with at least one iron compound to form a gel;
   b) curing said gel to form a porous hydrolyzed silicon product which contains iron;
   c) subsequently contacting the porous hydrolyzed silicon product with an oxidizing agent at a temperature below 400° C. to convert said iron to a ferrimagnetic state; and d) after exposing said product to said oxidizing agent, contacting said product with a reducing agent to convert said iron to a paramagnetic state, wherein said reducing agent is hydrogen gas and water.

2. The process of claim 1, wherein said silicon alkoxide is a teraalkylorthosilicate.

3. The process of claim 1, wherein said iron compound is ferric nitrate.

4. The process of claim 2, wherein said tetraalkylorthosilicate is tetraethylorthosilicate.

5. The process of claim 1, wherein said process further comprises forming said bulk material into a shaped monolith.

6. The process of claim 1, wherein said oxidizing agent comprises oxygen.

7. The process of claim 1, wherein said polymerizing is conducted in the presence of a catalyst.

8. The process of claim 7, wherein said catalyst comprises HF.

9. A process for synthesizing a bulk material having magnetic particles dispersed in an non-magnetic matrix, comprising the steps of:

a) polymerizing silicon alkoxide in solution with at least one iron compound to form a gel;

b) curing said gel to form a porous hydrolyzed silicon product which contains iron;

c) subsequently contacting the porous hydrolyzed silicon product with a reducing agent at a temperature below 400° C. to convert said iron to a superparamagnetic state; and d) after contacting said product with said reducing agent, contacting said product with a nitriding agent to convert said iron to a ferromagnetic state.

10. The process of claim 9, wherein said reducing agent is hydrogen.

11. The process of claim 9, wherein said nitriding agent comprises ammonia.

12. The process of claim 9, wherein said silicon alkoxide is a tetraalkylorthosilicate.

13. The process of claim 12, wherein said tetraalkylorthosilicate is tetraethylorthosilicate.

14. The process of claim 9, wherein said iron compound is ferric nitrate.

15. The process of claim 9, wherein said polymerizing is conducted in the presence of a catalyst.

16. The process of claim 15, wherein the catalyst comprises HF.

17. The process of claim 9, wherein the process further comprises forming said bulk material into a shaped monolith.

* * * * *